United States Patent Office 2,923,087
Patented Feb. 2, 1960

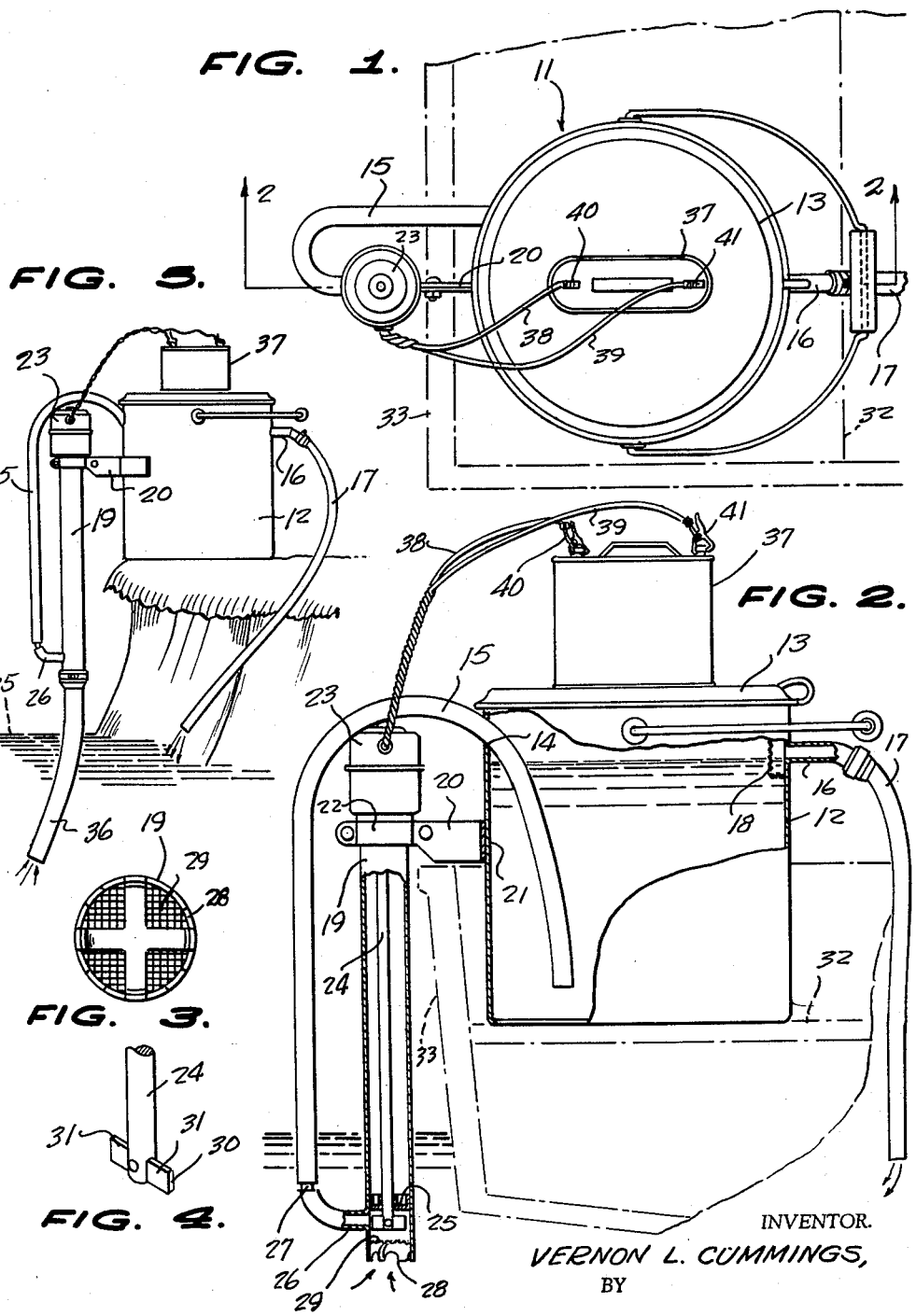

2,923,087

MINNOW BUCKET WATER CIRCULATING SYSTEM

Vernon L. Cummings, Lonoke, Ark.

Application May 2, 1958, Serial No. 732,698

1 Claim. (Cl. 43—55)

This invention relates to fishermen's apparatus, and more particularly to a bait bucket provided with means to circulate fresh water through the bucket so as to provide the necessary oxygen required to keep live bait, such a minnows, or the like, contained in the bucket, alive and in good condition.

The main object of the invention is to provide a novel and improved bait bucket provided with water circulating means to circulate fresh water therethrough, the bucket being simple in construction, being easy to use, and being adaptable for use either in a boat or on shore.

A further object of the invention is to provide an improved minnow bucket having means for circulating fresh water therethrough, the bucket being inexpensive to manufacture, being relatively compact in size, and being durable in construction.

Further objects and advantages of the invention will become apparent from the following description and claim, and from the accompanying drawings, wherein:

Figure 1 is a top view of an improved bait bucket constructed in accordance with the present invention.

Figure 2 is a vertical cross sectional view taken on the line 2—2 of Figure 1.

Figure 3 is an enlarged bottom view of the water intake member employed with the minnow bucket of Figures 1 and 2.

Figure 4 is an enlarged perspective view of the lower portion of the motor shaft and the propeller attached thereto, as employed in the bait bucket of Figures 1 and 2.

Figure 5 is a side elevational view illustrating the manner in which the bait bucket of Figures 1 to 4 may be adapted for use on shore adjacent to a body of water.

Referring to the drawings, 11 generally designates the improved bait bucket of the present invention, the bucket comprising a generally cylindrical main container 12 provided with a removable top lid 13. The container 12 is provided at the upper portion of its cylindrical wall with an aperture 14 through which extends a flexible water inlet conduit 15. Secured to the upper portion of the wall of the container 12 opposite the aperture 14 is an outlet conduit 16 to which is connected a flexible hose 17 of substantial length and adapted to be employed to discharge the overflow of water from the container 12 in a manner presently to be described. A protective screen 18 is secured in the upper portion of the container 12 over the connection of conduit 16 thereto to prevent minnows or other live bait stored in the container from being discharged through the outlet conduit 16 with the overflow from the container.

Designated at 19 is a rigid tubular housing which is secured to the container 12 by a suitable clamping bracket 20, the bracket being welded to container 12 at 21, as shown in Figure 2, and being formed with opposing clamping collar segments 22 which receive the rigid tubular member 19 and which clampingly engage same.

Mounted vertically on the top end of the rigid tubular member 19 is an electric motor 23 whose shaft 24 extends downwardly and axially through the tubular member 19 and is rotatably supported therein by suitable bearings 25 of the sealed type.

The lower portion of the rigid tubular member 19 is provided with the upwardly and outwardly extending arcuate conduit member 26 which is connected to the flexible conduit 15, as by the use of a suitable connector 27. The conduit 15 extends through the aperture 14 in the top portion of container 12 and terminates in the lower portion of the container, as shown in Figure 2.

The tubular member 19 is formed with a serrated bottom edge 28 in which is secured a suitable screen member 29 to filter the water passing upwardly into the tubular member 19. Secured to the end of the shaft 24 adjacent the connection of conduit 26 to the tubular member 19 is a transversely extending vertical blade member 30 projecting outwardly on opposite sides of shaft 24, as shown in Figure 4, and thus defining a pair of vertical impeller vanes 31, 31. The vanes 31, 31 are disposed substantially in the same horizontal plane as the connection of conduit 26 to the tubular member 19, whereby rotation of shaft 24 provides a pumping action which forces water upwardly through the conduit 26 and the hose 15 and discharges the water into the container 12.

As shown in Figures 1 and 2, the bait bucket may be employed in a boat, by supporting the main container 12 thereof on the rear seat 32 of the boat with the tubular member 19 extending into the water, the container 12 being positioned so that the bracket member 20 overlies the top edge of the stern 33 of the boat, as shown in Figure 2. Alternatively, the device may be supported on shore adjacent to a body of water 35, as shown in Figure 5, with the tubular member 19 extending over the body of water, a suitable hose extension 36 being connected to the lower end of the tubular member 19 and being immersed for a substantial depth in the body of water.

The motor 23 may be energized from a suitable source of power, for example, from a battery assembly 37 supported on the top lid 13 of container 12. Thus, the assembly may comprise a conventional housing containing a plurality of series-connected dry cells, the end terminals of the battery assembly being connected by suitable conductors 38 and 39 to the respective terminals of the motor 23. The conductors 38 and 39 are preferably provided with alligator clips 40 and 41 adapted to engage the terminals of the battery assembly 37, so that the conductors may be readily connected to the battery terminals or disconnected therefrom, as desired by the person using the device.

The discharge hose 17 is of sufficient length so that it may be extended over the side of the boat, when the device is employed in the manner illustrated in Figures 1 and 2, or may be extended over the body of water 35 to discharge into said body of water, when the device is employed in the manner illustrated in Figure 5.

In operation, the motor 23 rotates the shaft 24 and thus causes the vanes 31, 31 to rotate in the lower portion of tubular member 19, pumping freshwater into the lower portion of container 12 through conduit 26 and hose 17. When the water rises above the level of the outlet conduit 16, the excess water overflows through the outlet conduit and is discharged therefrom by the hose 17. Thus, a continuous circulation of fresh water through the bucket 12 is provided, whereby the minnows or other bait contained therein are kept alive and in good condition.

While a specific embodiment of an improved bait bucket has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A bait bucket comprising a main container having a removable top lid, a rigid tubular member disposed adjacent to and in spaced parallel relation to said main container at one side thereof, said tubular member being of a length substantially greater than the height of the main container and extending a substantial distance below the bottom of said main container, an electric motor mounted vertically on the top end of said tubular member and having a shaft extending axially through substantially the entire length of said tubular member to the bottom portion thereof, bracket means secured to and extending horizontally from the upper portion of the main container and clampingly engaging said rigid tubular member immediately subjacent said electric motor, whereby said motor is supported on said bracket means, bearing means in the bottom portion of said tubular member rotatably supporting said shaft axially in said tubular member, a conduit connected to the tubular member subjacent said bearing means and extending through the upper portion of the wall of said main container into the lower portion thereof, a propeller having a plurality of vertical blades mounted on said shaft adjacent and in horizontal alignment with the connection of said conduit to said tubular member, a battery mounted on said top lid and being electrically connected to said motor, and an overflow conduit connected to the upper portion of said main container.

References Cited in the file of this patent

UNITED STATES PATENTS

| | | |
|---|---|---|
| 668,507 | Fisk | Feb. 19, 1901 |
| 761,730 | Tucker | June 7, 1904 |
| 1,801,117 | Smith | Apr. 14, 1931 |
| 2,151,225 | Newton | Mar. 21, 1939 |
| 2,364,686 | Balisteri et al. | Dec. 12, 1944 |